United States Patent
Takada et al.

(10) Patent No.: US 10,436,964 B2
(45) Date of Patent: Oct. 8, 2019

(54) INORGANIC POLARIZING PLATE, METHOD OF MANUFACTURING THE SAME, AND OPTICAL INSTRUMENT

(71) Applicant: Dexerials Corporation, Tokyo (JP)

(72) Inventors: Akio Takada, Tokyo (JP); Seiji Kumagai, Tokyo (JP); Hideto Sagawa, Tokyo (JP); Takahiro Kimura, Tokyo (JP); Kazuyuki Shibuya, Tokyo (JP); Toshiaki Sugawara, Tokyo (JP); Shigeshi Sakakibara, Tokyo (JP); Yusuke Matsuno, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 15/888,332

(22) Filed: Feb. 5, 2018

(65) Prior Publication Data
US 2018/0224589 A1 Aug. 9, 2018

(30) Foreign Application Priority Data

Feb. 7, 2017 (JP) ................................ 2017-020349
Dec. 6, 2017 (JP) ................................ 2017-233925

(51) Int. Cl.
*G02B 5/30* (2006.01)
*G02B 1/14* (2015.01)

(52) U.S. Cl.
CPC ............ *G02B 5/3058* (2013.01); *G02B 1/14* (2015.01)

(58) Field of Classification Search
CPC ........... G02B 1/14; G02B 1/18; G02B 5/3058
USPC .......... 359/485.05, 487.03, 900; 216/24, 41; 427/163.1
See application file for complete search history.

(56) References Cited

U.S. PATENT DOCUMENTS

| 6,156,485 | A | * | 12/2000 | Tang | .................. | H01L 21/0276 216/41 |
| 7,639,414 | B2 | | 12/2009 | Hwang et al. | | |
| 7,772,768 | B2 | | 8/2010 | Oh et al. | | |
| 9,477,024 | B2 | | 10/2016 | Takahashi et al. | | |
| 9,488,762 | B2 | * | 11/2016 | Sasaki | .................. | G02B 5/3058 |

(Continued)

FOREIGN PATENT DOCUMENTS

| JP | 2008-046637 A | 2/2008 |
| JP | 2008-216964 A | 9/2008 |

(Continued)

OTHER PUBLICATIONS

Notification of Reasons for Refusal issued for corresponding Japanese Patent Application No. 2017-020349, dated Mar. 21, 2017 (4 pages).

*Primary Examiner* — Ricky D Shafer
(74) *Attorney, Agent, or Firm* — Osha Liang LLP (57) ABSTRACT

Provided is an inorganic polarizing plate having a wire grid structure including: a transparent substrate; and grid-shaped protrusions arranged on the transparent substrate at a pitch shorter than a wavelength of light in a use band, in which the grid-shaped-protrusion includes, in order from the transparent substrate side, a reflection layer and a reflection suppressing layer which includes a dielectric material and a non-dielectric material and of which a content of the non-dielectric material increases as a separation from the reflection layer increases. In addition, provided are a method of manufacturing the inorganic polarizing plate and an optical instrument including the inorganic polarizing plate.

16 Claims, 7 Drawing Sheets

(56) References Cited

U.S. PATENT DOCUMENTS

| | | |
|---|---|---|
| 9,703,026 B2 | 7/2017 | Takada et al. |
| 9,988,724 B2 * | 6/2018 | Takahashi ............ G02B 5/3058 |
| 2008/0037094 A1 | 2/2008 | Hwang et al. |
| 2008/0225389 A1 | 9/2008 | Oh et al. |
| 2013/0286358 A1 * | 10/2013 | Takahashi ............ G02B 5/3058 353/20 |
| 2014/0063467 A1 | 3/2014 | Takahashi et al. |
| 2014/0354910 A1 * | 12/2014 | Park ................. G02F 1/133536 349/42 |
| 2015/0002791 A1 * | 1/2015 | Nam ................... G02B 5/3058 349/96 |
| 2015/0015948 A1 | 1/2015 | Takada et al. |
| 2016/0299273 A1 * | 10/2016 | Oh ....................... G02B 5/3058 |
| 2018/0081103 A1 * | 3/2018 | Takeda ..................... G02B 5/30 |
| 2018/0180785 A1 * | 6/2018 | Takeda ................ G02B 5/3058 |
| 2018/0180786 A1 * | 6/2018 | Takeda ................ G02B 5/3058 |

FOREIGN PATENT DOCUMENTS

| | | |
|---|---|---|
| JP | 2012-058397 A | 3/2012 |
| JP | 2014-052439 A | 3/2014 |
| JP | 2015-034959 A | 2/2015 |
| JP | 2015-108845 A | 6/2015 |

\* cited by examiner

INORGANIC POLARIZING PLATE, METHOD OF MANUFACTURING THE SAME, AND OPTICAL INSTRUMENT

This application is based on and claims the benefit of priority from Japanese Patent Application Nos. 2017-020349 and 2017-233925, respectively filed on 7 Feb. 2017 and 6 Dec. 2017, the contents of which are incorporated herein by reference.

BACKGROUND OF THE INVENTION

Field of the Invention

The present invention relates to an inorganic polarizing plate, a method of manufacturing the inorganic polarizing plate, and an optical instrument.

Related Art

A polarizing plate is an optical element that absorbs polarized light in an absorption-axis direction and transmits polarized light in a transmission-axis direction perpendicular to the absorption-axis direction. In recent years, instead of organic polarizing plates, wire grid type inorganic polarizing plates have begun to be adopted in optical instruments such as liquid crystal projectors which require heat resistance.

Up to now, as the wire grid type inorganic polarizing plate, inorganic polarizing plates having various structures have been proposed.

Figure 13:
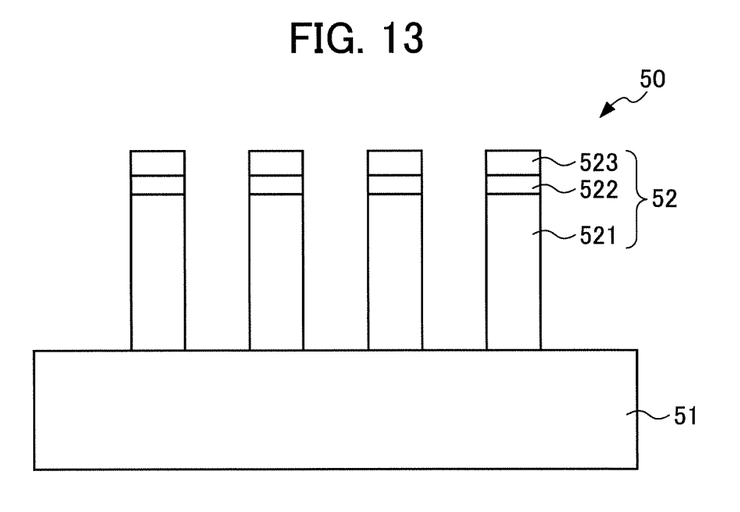
FIG. 13 is a schematic cross-sectional view illustrating an example of an inorganic polarizing plate of the related art.

For example, Patent Document 1 discloses an inorganic polarizing plate having a structure as illustrated in FIG. 13. The inorganic polarizing plate 50 illustrated in FIG. 13 includes a transparent substrate 51 and grid-shaped protrusions 52 arranged on the transparent substrate 51 at a pitch shorter than a wavelength of light in a use band, and the grid-shaped protrusion 52 includes a reflection layer 521, a dielectric layer 522, and an absorption layer 523 in this order from the transparent substrate 51 side. For the absorption layer 523, for example, a metal-containing semiconductor such as FeSi is used.

In addition, Patent Document 2 also discloses an inorganic polarizing plate including a transparent substrate, a grid (reflection layer) arranged on the transparent substrate at a pitch shorter than a wavelength of light in a use band, and a low reflection member laminated on the grid. For the low reflection member, for example, a mixture of a metal and a dielectric material is used.

Patent Document 1: Japanese Unexamined Patent Application, Publication No. 2015-34959

Patent Document 2: Japanese Unexamined Patent Application, Publication No. 2008-46637

SUMMARY OF THE INVENTION

The inorganic polarizing plate disclosed in Patent Document 2 is considered to be excellent in productivity since the inorganic polarizing plate is smaller in the number of layers than the inorganic polarizing plate disclosed in Patent Document 1. However, as confirmed by the inventors of the present invention, it turned out that the inorganic polarizing plate disclosed in Patent Document 2 has difficulty in achieving both high transmission-axis transmittance and low absorption-axis reflectance and has room for improvement in terms of optical characteristics.

The present invention has been made in view of the above problems, and an object of the present invention is to provide an inorganic polarizing plate that is excellent in productivity and optical characteristics, a method of manufacturing the inorganic polarizing plate, and an optical instrument including the inorganic polarizing plate.

In order to achieve the above-described object, according to an aspect of the present invention, there is provided an inorganic polarizing plate (for example, inorganic polarizing plate 10 and 20 to be described later) having a wire grid structure, including: a transparent substrate (for example, transparent substrate 11 and 21 to be described later); and grid-shaped protrusions (for example, grid-shaped protrusions 12 and 22 to be described later) arranged on the transparent substrate at a pitch shorter than a wavelength of light in a use band, in which the grid-shaped protrusion includes, in order from the transparent substrate side, a reflection layer (for example, reflection layers 121 and 222 to be described later) and a reflection suppressing layer (for example, reflection suppressing layers 122 and 223 to be described later) which includes a dielectric material and a non-dielectric material and of which a content of the non-dielectric material increases as a separation from the reflection layer increases.

The grid-shaped protrusion may further include a second reflection suppressing layer (for example, a second reflection suppressing layer 221 to be described later) which includes a dielectric material and a non-dielectric material and of which a content of the non-dielectric material changes in a film thickness direction between the transparent substrate and the reflection layer.

A width of the reflection suppressing layer may be smaller than a width of the reflection layer.

The inorganic polarizing plate may further include a protective film which covers at least a surface of the reflection suppressing layer.

The protective film may include at least one of an inorganic oxide film and a fluorine-based water repellent film.

The dielectric material included in the reflection suppressing layer may contain at least one of Si and a Si oxide.

The non-dielectric material included in the reflection suppressing layer may contain a single-element substance (except for a single-element substance of Si) of at least one element selected from a group including Fe, Ta, Si, Ti, Mg, W, Mo, and Al or an alloy thereof.

The non-dielectric material included in the reflection suppressing layer may contain a single-element substance of at least one metal selected from a group including Fe, Ta, W, Mo, and Al or an alloy of these metals.

The content of the non-dielectric material at an end of a side of the reflection suppressing layer opposite to the reflection layer may be 45 atm % to 98 atm %.

According to the present invention, there is also provided a method of manufacturing an inorganic polarizing plate having a wire grid structure, including: forming a laminated body including a reflection layer and a reflection suppressing layer which includes a dielectric material and a non-dielectric material and of which a content of the non-dielectric material increases as a separation from the reflection layer increases on a transparent substrate in this order from the transparent substrate side; and forming grid-shaped protrusions arranged on the transparent substrate at a pitch shorter than a wavelength of light in a use band by selectively etching the laminated body.

In the manufacturing method, the reflection suppressing layer may be formed by disposing a dielectric material and a non-dielectric material as sputtering targets in a chamber and controlling a discharge state of the sputtering targets.

The manufacturing method may further include applying heat treatment after forming the laminated body or after forming the grid-shaped protrusions.

The dielectric material included in the reflection suppressing layer may contain at least one of Si and a Si oxide.

The non-dielectric material included in the reflection suppressing layer may contains a single-element substance (except for a single-element substance of Si) of at least one element selected from a group including Fe, Ta, Si, Ti, Mg, W, Mo, and Al or an alloy thereof.

The content of the non-dielectric material at an end of a side of the reflection suppressing layer opposite to the reflection layer may be 45 atm % to 98 atm %.

In addition, the present invention provides an optical instrument including the inorganic polarizing plate.

According to the present invention, it is possible to provide an inorganic polarizing plate that is excellent in productivity and optical characteristics, a method of manufacturing the inorganic polarizing plate, and an optical instrument including the inorganic polarizing plate.

DETAILED DESCRIPTION OF THE INVENTION

Hereinafter, embodiments of the present invention will be described in detail with reference to the drawings.

[Inorganic Polarizing Plate]

An inorganic polarizing plate according to an embodiment is an inorganic polarizing plate having a wire grid structure and including a transparent substrate and grid-shaped protrusions arranged at a pitch (period) shorter than a wavelength of light in a use band, in which the grid-shaped protrusion includes, in order from the transparent substrate side, a reflection layer and a reflection suppressing layer which includes a dielectric material and a non-dielectric material and of which a content of the non-dielectric material changes in a film thickness direction.

Figure 1:
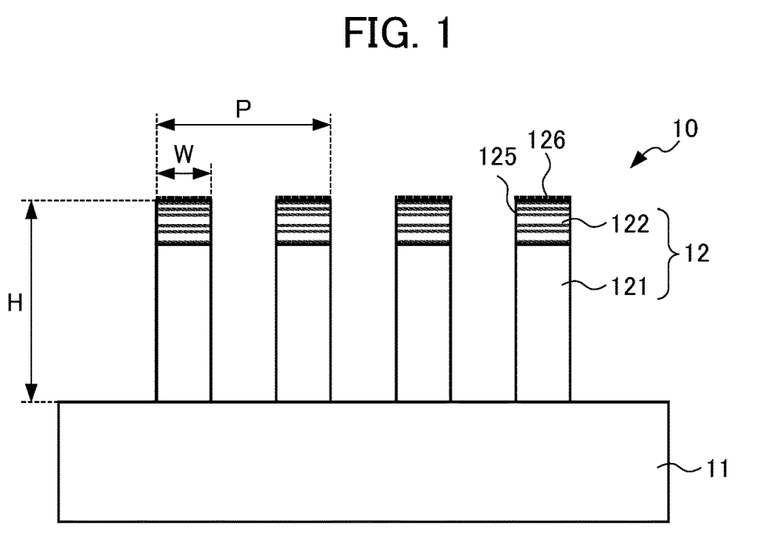
FIG. 1 is a schematic cross-sectional view illustrating an inorganic polarizing plate according to a first embodiment of the present invention.

FIG. 1 is a schematic cross-sectional view of an inorganic polarizing plate 10 according to a first embodiment. As illustrated in FIG. 1, the inorganic polarizing plate 10 according to the first embodiment includes a transparent substrate 11 and grid-shaped protrusions 12 arranged on the transparent substrate 11 at a pitch P shorter than a wavelength of light in a use band. The grid-shaped protrusion 12 includes a reflection layer 121 and a reflection suppressing layer 122 in this order from the transparent substrate 11 side. That is, the inorganic polarizing plate 10 has a wire grid structure where the grid-shaped protrusions 12 where the reflection layer 121 and the reflection suppressing layer 122 are laminated in this order from the transparent substrate 11 side are arranged in a one-dimensional grid shape on the transparent substrate 11.

A portion of light incident from a surface on which the grid-shaped protrusions 12 of the inorganic polarizing plate 10 are formed is absorbed and attenuated as the portion of the light passes through the reflection suppressing layer 122. In the light transmitted through the reflection suppressing layer 122, a polarized wave (TM wave (P wave)) having an electric field component in a direction perpendicular to a longitudinal direction of the grid-shaped protrusion 12 passes through the reflection layer 121 with high transmittance. On the other hand, in the light transmitted through the reflection suppressing layer 122, a polarized wave (TE wave (S wave)) having the electric field component in the direction perpendicular to the longitudinal direction of the grid-shaped protrusion 12 is mostly reflected by the reflection layer 121. The TE wave reflected by the reflection layer 121 is attenuated due to absorption, interference, reflection, or the like in the reflection layer 121 and reflection suppressing layer 122. As described above, the inorganic polarizing plate 10 can obtain desired polarization characteristics by selectively attenuating the TE waves.

The transparent substrate 11 is not particularly limited as long as the transparent substrate is a substrate that exhibits translucency with respect to light in a use band, and can be appropriately selected according to the purpose. The phrase "exhibiting translucency with respect to light in a use band" does not denote that the transmittance of light in a use band is 100%, but the phrase may denote exhibiting translucency capable of retaining a function as an inorganic polarizing plate. As the light in the use band may, for example, visible light having a wavelength of about 380 nm to 810 nm may be exemplified.

As the constituent material of the transparent substrate 11, a material having a refractive index of 1.1 to 2.2 is preferable, and glass, quartz, sapphire, and the like may be exemplified. As the constituent material of the transparent substrate 11, glass is more preferable from the viewpoint of cost and light transmittance.

The shape of a main surface of the transparent substrate 11 is not particularly limited, and a shape (for example, a rectangular shape) according to the purpose is appropriately selected. The average thickness of the transparent substrate 11 is preferably, for example, 0.3 mm to 1 mm.

The grid-shaped protrusions 12 extend in a band shape with the absorption-axis direction of the inorganic polarizing plate 10 as a longitudinal direction and are arranged on the transparent substrate 11 at a pitch P shorter than the wavelength of the light in the use band.

The pitch P of the grid-shaped protrusions 12 is not particularly limited as long as the pitch is shorter than the wavelength of the light in the use band. From the viewpoint of ease of fabrication and stability, the pitch P of the grid-shaped protrusions 12 is preferably, for example, 100 nm to 200 nm. The pitch P of the grid-shaped protrusions 12 may be measured by observation with a scanning electron microscope or a transmission electron microscope. For example, by using the scanning electron microscope or the transmission electron microscope, the pitches for arbitrary four grid-shaped protrusions may be measured, and the arithmetic average value thereof may be set to the pitch of the grid-shaped protrusions 12.

Although the width W of the grid-shaped protrusion 12 is not particularly limited, the width is preferably smaller than the width of the recess between the grid-shaped protrusions 12 from the viewpoint of suppressing re-deposition in forming the grid-shaped protrusion 12 by etching. The width W of the grid-shaped protrusion 12 may be measured by observation with the scanning electron microscope or the transmission electron microscope. For example, by using the scanning electron microscope or the transmission electron microscope, the widths at the height center positions for arbitrary four grid-shaped protrusions may be measured, and the arithmetic average value thereof may be set to the width W of the grid-shaped protrusion 12.

In a case where the grid-shaped protrusions 12 are formed by etching, in order to remove the etching residue, over-etching which continues etching until a portion of the transparent substrate 11 is removed is required. If the over-etching amount is too small, the etching residue may remain on the transparent substrate 11, and thus, the transmittance of the inorganic polarizing plate 10 may be decreased. On the other hand, if the over-etching amount is too large, the material of the transparent substrate 11 removed by etching adheres to the grid-shaped protrusions 12, and thus, the shape of the grid-shaped protrusions 12 may be disturbed. The disturbance in shape of the grid-shaped protrusion 12 causes scattering of light and the like, which leads to deterioration of optical characteristics.

Figure 2:
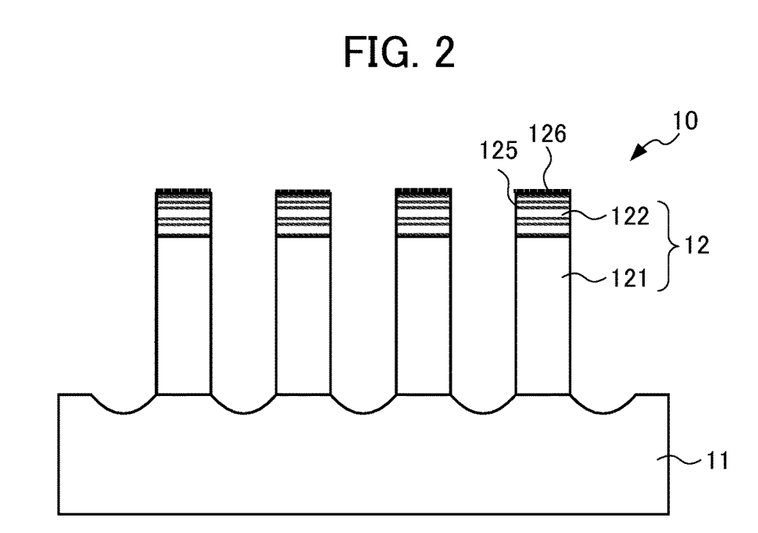
FIG. 2 is a schematic cross-sectional view illustrating an example of grooves formed in a transparent substrate in the inorganic polarizing plate according to the first embodiment.

According to experiments conducted by the inventors of the present invention, in a case where the height of the grid-shaped protrusion 12 is 100 nm or more, it is preferable that the over-etching amount is controlled such that the maximum depth of the groove formed in the transparent substrate 11 is 5 nm to 30 nm. The cross-sectional shape of the groove is not particularly limited, but from the viewpoint of suppressing re-deposition, as illustrated in FIG. 2, it is preferable that the shape of the groove is arcuate with respect to the center of the groove.

The height H of the grid-shaped protrusion 12 is not particularly limited, but it is preferable that the height is, for example, 50 nm to 300 nm. The height H of the grid-shaped protrusion 12 may be measured by observation with a scanning electron microscope or a transmission electron microscope. For example, by using the scanning electron microscope or the transmission electron microscope, the heights of arbitrary four grid-shaped protrusions may be measured, and the arithmetic average value thereof may be set to the height H of the grid-shaped protrusion 12.

The reflection layer 121 constituting the grid-shaped protrusion 12 has a function as a wire grid type polarizer to attenuate a polarized wave (TE wave (S wave)) having an electric field component in a direction parallel to the longitudinal direction of the reflection layer 121 and transmit a polarized wave (TM wave (P wave)) having an electric field component in a direction perpendicular to the longitudinal direction of the reflection layer 121.

The constituent material of the reflection layer 121 is not particularly limited as long as the constituent material is a material that is reflective to light in a use band. As the constituent material of the reflection layer 121, for example, a single-element substance such as Al, Ag, Cu, Mo, Cr, Ti, Ni, W, Fe, Si, Ge, and Te or an alloy containing at least one or more of these elements may be exemplified.

The film thickness of the reflection layer 121 is not particularly limited, but it is preferable that the film thickness is, for example, 40 nm to 200 nm. The film thickness of the reflection layer 121 may be measured by observation with a scanning electron microscope or a transmission electron microscope. For example, by using the scanning electron microscope or the transmission electron microscope, the film thicknesses of arbitrary four reflection layers may be measured, and the arithmetic average value thereof may be set to the film thickness of the reflection layer 121.

The reflection suppressing layer 122 constituting the grid-shaped protrusion 12 includes a dielectric material and a non-dielectric material and is laminated on the reflection layer 121.

As the dielectric material, for example, oxides of elements such as Si, Al, Be, Bi, Ti, Ta, and B; nitrides of elements such as Si and B; fluorides of elements such as Mg and Ca; and Si, Ge, carbon, cryolite, and the like may be exemplified. One of these dielectric materials may be used alone or two or more of these dielectric materials may be used in combination. In a case where two or more of these dielectric materials are used in combination, two or more of the dielectric materials may be used by mixing, or different dielectric materials may be used in the film thickness direction.

As the non-dielectric material, for example, a single-element substance (excluding a single-element substance of Si) of at least one element selected from a group including Fe, Ta, Si, Ti, Mg, W, Mo, and Al or an alloy thereof may be exemplified. As the alloy, a FeSi alloy, a TaSi alloy, and the like may be exemplified. From the viewpoint of etchability, the content of the Fe of the FeSi alloy is preferably 50 atm % or less, and more preferably 10 atm % or less. From the viewpoint of reflectance and transmittance, the content of the Ta of the TaSi alloy is preferably 40 atm % or less. One of these non-dielectric materials may be used alone or two or more of these non-dielectric materials may be used in combination. In a case where two or more of these non-dielectric materials are used in combination, two or more of these non-dielectric materials may be mixed, or different non-dielectric materials may be used in the film thickness direction.

Among these materials, it is preferable that the dielectric material contains at least one of Si and a Si oxide (for example, silica), and the non-dielectric material contains a metal. As the metal, for example, a single-element substance of at least one metal selected from a group including Fe, Ta, W, Mo, and Al or an alloy of these metals may be exemplified. By combining at least one of Si and a Si oxide with a metal to form a cermet, the heat resistance of the reflection suppressing layer 122 tends to be further improved.

As described above, the content of the non-dielectric material (125) in the reflection suppressing layer 122 changes in the film thickness direction. Due to such a change, the optical characteristics of the inorganic polarizing plate 10 tend to be improved. In addition, by adjusting the change mode of the content of the non-dielectric material (125), the wavelength at the minimum point of the absorption-axis reflectance Rs can be adjusted.

From the viewpoint of further improving the optical characteristics of the inorganic polarizing plate 10, it is preferable that the content of the non-dielectric material (125) in the reflection suppressing layer 122 increases as the separation from the reflection layer 121 increases. That is, the reflection suppressing layer 122 preferably has a composition gradient where the content of the non-dielectric material (125) increases as the separation from the reflection layer 121 increases.

As the composition gradient, for example, a gradient may be exemplified where the content of the non-dielectric material (125) at the end of the reflection layer 121 side is 0 atm % to 20 atm %, and the content of the non-dielectric material (125) at the end of the side opposite to the reflection layer 121 is 45 atm % to 98 atm %. The content of the non-dielectric material (125) at the end of the reflection layer 121 side may be 0.1 atm % to 20 atm % or 3 atm % to 20 atm %. In addition, the content of the non-dielectric material (125) at the end of the side opposite to the reflection layer 121 may be 45 atm % to 95 atm %, may be 45 atm % to 80 atm %, or may be 45 atm % to 60 atm %. In addition, the composition gradient may linearly change or nonlinearly (for example, stepwise) change.

The film thickness of the reflection suppressing layer 122 is not particularly limited as long as the film thickness of the reflection suppressing layer is smaller than the film thickness of the reflection layer 121, and is preferably, for example, 10 nm to 100 nm. The film thickness of the reflection suppressing layer 122 may be measured by observation with a scanning electron microscope or a transmission electron microscope similarly to the film thickness of the reflection layer 121.

Figure 3:
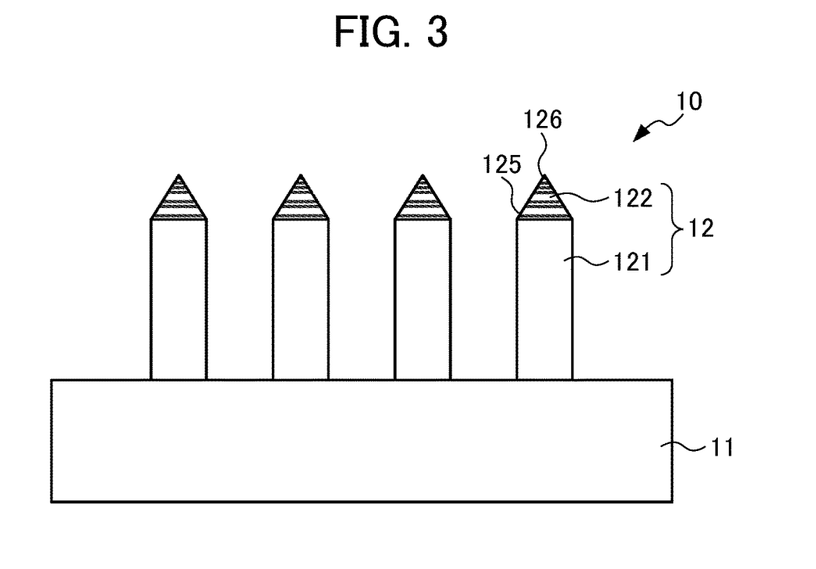
FIG. 3 is a schematic cross-sectional view illustrating another example of a reflection suppressing layer in the inorganic polarizing plate according to the first embodiment.

In addition, in FIG. 1, the width of the reflection layer 121 is substantially equal to the width of the reflection suppressing layer 122. However, the present invention is not limited to this configuration, but the width of the reflection suppressing layer 122 may be smaller than the width of the reflection layer 121. With such a configuration, the permeability of the inorganic polarizing plate 10 tends to be further improved. For example, as illustrated in FIG. 3, the cross-sectional shape of the reflection suppressing layer 122 in the cross section perpendicular to the longitudinal direction of the grid-shaped protrusion 12 may have a substantially triangular shape with an acute angle as a tip.

The inorganic polarizing plate 10 may further include a protective film (126) which covers at least the surface of the reflection suppressing layer 122 as necessary. By providing the inorganic polarizing plate 10 with the protective film (126), the reliability such as moisture resistance tends to be further improved. In addition, the protective film (126) may cover the entire surface of the transparent substrate 11 and the grid-shaped protrusion 12.

As the protective film (126), a film made of a dielectric material may be exemplified, and specifically, an inorganic oxide film, a silane-based water repellent film, and the like may be exemplified. As the inorganic oxide film, a Si oxide film, a Hf oxide film, and the like may be exemplified. The silane-based water repellent film may be a film formed by applying a fluorine-based silane compound such as perfluorodecyltriethoxysilane (FDTS) or may be a film formed by applying a nonfluorine-based silane compound such as octadecyltrichlorosilane (OTS). Among these protective films, it is preferable to include at least one of the inorganic oxide film and the fluorine-based water repellent film. In a case where the inorganic polarizing plate 10 includes an Hf oxide film or a fluorine-based water repellent film as the protective film (126), the antifouling ability of the inorganic polarizing plate 10 can also be improved.

Figure 4:
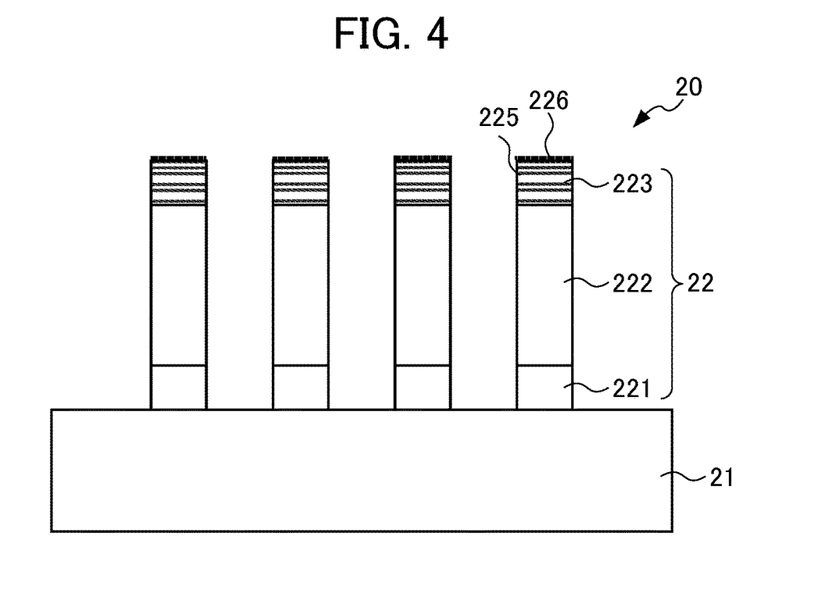
FIG. 4 is a schematic cross-sectional view illustrating an inorganic polarizing plate according to a second embodiment of the present invention.

FIG. 4 is a schematic cross-sectional view of an inorganic polarizing plate 20 according to a second embodiment of the present invention. As illustrated in FIG. 4, the inorganic polarizing plate 20 according to the second embodiment includes a transparent substrate 21 and grid-shaped protrusions 22 arranged on the transparent substrate 21 at a pitch shorter than a wavelength of light in a use band. The grid-shaped protrusion 22 includes a second reflection suppressing layer 221, a reflection layer 222, and a reflection suppressing layer 223 in this order from the transparent substrate 21 side. That is, the inorganic polarizing plate 20 has a wire grid structure where the grid-shaped protrusions 22 where the second reflection suppressing layer 221, the reflection layer 222, and the reflection suppressing layer 223 are laminated in this order from the transparent substrate 21 side are arranged on the transparent substrate 21 in a one-dimensional grid shape.

The grid-shaped protrusion 22 of the inorganic polarizing plate 20 includes a second reflection suppressing layer 221 between the transparent substrate 21 and the reflection layer 222. As a result, the inorganic polarizing plate 20 can also obtain desired polarization characteristics with respect to light incident from the transparent substrate 21 side. The transparent substrate 21, the reflection layer 222, and the reflection suppressing layer 223 are similar to the transparent substrate 11, the reflection layer 121 and the reflection suppressing layer 122 in FIG. 1, and thus, detailed description thereof will be omitted.

The second reflection suppressing layer 221 includes a dielectric material and a non-dielectric material and is disposed between the transparent substrate 21 and the reflection layer 222.

As the dielectric material, the same material as the reflection suppressing layer 122 in FIG. 1 may be exemplified. One of these dielectric materials may be used alone, or two or more of these dielectric materials may be used in combination.

In a case where two or more of these dielectric materials are used in combination, two or more of these dielectric materials may be used by mixing, or different dielectric materials may be used in the film thickness direction.

As the non-dielectric material, the same material as the reflection suppressing layer 122 in FIG. 1 may be exemplified. One of the non-dielectric materials may be used alone, or two or more of the non-dielectric materials may be used in combination. In a case where two or more of the non-dielectric materials are used in combination, two or more of the non-dielectric materials may be mixed, or different non-dielectric materials may be used in the film thickness direction.

The content of the non-dielectric material (225) in the second reflection suppressing layer 221 changes in the film thickness direction. Due to such a change, the optical characteristics of the inorganic polarizing plate 10 tend to be improved. In addition, by adjusting the change mode of the content of the non-dielectric material (225), the wavelength at the minimum point of the absorption-axis reflectance Rs can be adjusted.

From the viewpoint of further improving the optical characteristics of the inorganic polarizing plate 10, it is preferable that the content of the non-dielectric material (225) in the second reflection suppressing layer 221 increases as the separation from the reflection layer 222 increases. That is, the second reflection suppressing layer 221 preferably has a composition gradient where the content of the non-dielectric material (225) increases as the separation from the reflection layer 222 increases.

As the composition gradient, for example, a gradient may be exemplified where the content of the non-dielectric material (225) at the end of the reflection layer 222 side is 0 atm % to 20 atm %, and the content of the non-dielectric material (225) at the end of the transparent substrate 21 side is 45 atm % to 98 atm %. The content of the non-dielectric material (225) at the end of the reflection layer 222 side may be 0.1 atm % to 20 atm % or may be 3 atm % to 20 atm %. In addition, the content of the non-dielectric material (225) at the end of the transparent substrate 21 side may be 45 atm % to 95 atm %, may be 45 atm % to 80 atm %, or may be 45 atm % to 60 atm %. In addition, the composition gradient may linearly change or nonlinearly (for example, stepwise) change.

In addition, the types of the dielectric material and the non-dielectric material in the second reflection suppressing layer 221 and the change mode of the content of the non-dielectric material (225) may be the same as or different from those of the reflection suppressing layer 223.

The film thickness of the second reflection suppressing layer 221 is not particularly limited as long as the film thickness is smaller than the film thickness of the reflection layer 222, and the film thickness is preferably, for example, 10 nm to 100 nm. The film thickness of the second reflection suppressing layer 221 may be measured by observation with a scanning electron microscope or a transmission electron microscope similarly to the film thickness of the reflection suppressing layer 122 in FIG. 1.

Similarly to the inorganic polarizing plate 10 illustrated in FIG. 1, the inorganic polarizing plate 20 may further include a protective film (226) which covers at least the surface of the reflection suppressing layer 223 as necessary. By providing the inorganic polarizing plate 20 with the protective film (226), the reliability such as moisture resistance tends to be further improved. In addition, the protective film (226) may cover the entire surface of the transparent substrate 21 and the grid-shaped protrusions 22.

[Method of Manufacturing Inorganic Polarizing Plate]

A method of manufacturing an inorganic polarizing plate according to the embodiment includes: a step of forming a laminated body including a reflection layer and a reflection suppressing layer which includes a dielectric material and a non-dielectric material and of which a content of the non-dielectric material changes in a film thickness direction on a transparent substrate in this order from the transparent substrate side; and a step of forming grid-shaped protrusions arranged on the transparent substrate at a pitch shorter than a wavelength of light in a use band by selectively etching the laminated body.

Hereinafter, as an example, a method of manufacturing an inorganic polarizing plate having a structure as illustrated in FIG. 1 will be described.

First, a reflection layer is formed on the transparent substrate. As a method of forming the reflection layer, a sputtering method, a vapor deposition method, or the like may be exemplified.

Next, a reflection suppressing layer is formed on the reflection layer. The reflection suppressing layer includes a dielectric material and a non-dielectric material, and the content of the non-dielectric material changes in the film thickness direction. From the viewpoint of further improving the optical characteristics of the inorganic polarizing plate, it is preferable that the content of the non-dielectric material in the reflection suppressing layer increases as the separation from the reflection layer increases. That is, the reflection suppressing layer preferably has a composition gradient where the content of the non-dielectric material increases as the separation from the reflection layer increases. The composition gradient may linearly change or nonlinearly (for example, stepwise) change.

As the method of forming the reflection suppressing layer, a sputtering method, an evaporation method, or the like may be exemplified, and a sputtering method using multiple targets is preferable. By disposing the dielectric material and the non-dielectric material as sputtering targets in the chamber and controlling the discharge state of the sputtering targets, it is possible to form the reflection suppressing layer where the content of the non-dielectric material exhibits a desired change mode.

Then, a one-dimensional grid-shaped mask pattern is formed on the reflection suppressing layer by a photolithography method, a nanoimprinting method, or the like. Then, by selectively etching the laminated body including the reflection layer and the reflection suppressing layer, the grid-shaped protrusions arranged on the transparent substrate at a pitch shorter than a wavelength of light in a use band are formed. As an etching method, for example, a dry etching method using an etching gas corresponding to an etching object may be exemplified.

The method of manufacturing the inorganic polarizing plate according to the embodiment may further include a step of applying heat treatment after formation of the laminated body or after formation of the grid-shaped protrusion. By adjusting the change mode of the content of the non-dielectric material in the reflection suppressing layer by thermal diffusion, it is possible to adjust the optical characteristics of the inorganic polarizing plate. In addition, by forming an interface layer at the interface between the reflection layer and the reflection suppressing layer by heat treatment, it is possible to adjust the optical characteristics of the inorganic polarizing plate and to improve the adhesion between the reflection layer and the reflection suppressing layer.

The heat treatment temperature is preferably set appropriately in consideration of the heat resistance of the reflection layer and reflection suppressing layer. For example, in a case where the constituent material of the reflection layer is Al, it is preferable that the temperature is sufficiently lower than about 660° C., which is the melting point of Al.

In addition, the method of manufacturing the inorganic polarizing plate according to the embodiment may further include a step of covering at least the surface of the reflection suppressing layer with a protective film (not shown). In addition, the protective film may cover the entire surface of the transparent substrate and the grid-shaped protrusions.

[Optical Instrument]

An optical instrument according to the embodiment includes the above-described inorganic polarizing plate according to the embodiment. As the optical instrument, a liquid crystal projector, a head-up display, a digital camera, or the like may be exemplified. Since the inorganic polarizing plate according to the embodiment is excellent in heat resistance as compared with an organic polarizing plate, the inorganic polarizing plate is appropriate for applications such as a liquid crystal projector, a head-up display, and the like which are required to have heat resistance.

In a case where the optical instrument according to the embodiment includes a plurality of polarizing plates, at least one of the plurality of polarizing plates may be the inorganic polarizing plate according to the embodiment. For example, in a case where the optical instrument according to the embodiment is a liquid crystal projector, at least one of the polarizing plates arranged on the incident side and the emitting side of the liquid crystal panel may be the inorganic polarizing plate according to the embodiment.

According to the above-described inorganic polarizing plate, the method of manufacturing the inorganic polarizing plate, and the optical instrument, it is possible to obtain the following effects.

Since the inorganic polarizing plate according to the embodiment is smaller in the number of layers than the inorganic polarizing plate of the related art illustrated in FIG. 13, the inorganic polarizing plate according to the embodiment is excellent in productivity. In addition, since the inorganic polarizing plate according to the embodiment is smaller in the number of layers than the inorganic polarizing plate of the related art illustrated in FIG. 13, disturbance in edge roughness hardly occurs, and deterioration of optical characteristics due to the disturbance of edge roughness can be suppressed. Furthermore, the inorganic polarizing plate according to the embodiment is excellent in optical characteristics since the content of the non-dielectric material in the reflection suppressing layer changes in the film thickness direction.

In addition, the present invention is not limited to the above-described embodiment, and modifications and improvements within a range in which the object of the present invention can be achieved are included in the present invention.

EXAMPLES

Next, examples of the present invention will be described, but the present invention is not limited to these examples.

Examples 1 to 3 and Comparative Example 1

In Examples 1 to 3 and Comparative Example 1, the optical characteristics of the inorganic polarizing plates were verified by electromagnetic field simulation according to a rigorous coupled wave analysis (RCWA) method. For the simulation, a grating simulator Gsolver produced by Grating Solver Development was used.

In Examples 1 to 3, the inorganic polarizing plates having the structure illustrated in FIG. 1 were subjected to the simulation. In each of the inorganic polarizing plates of Examples 1 to 3, grid-shaped protrusions having a width of 46 nm were arranged on a transparent substrate at a pitch of 140 nm. The grid-shaped protrusion was set to a grid-shaped protrusion where a reflection suppressing layer having a film thickness of 38 nm was laminated on a reflection layer having a film thickness of 180 nm. The constituent material of the reflection layer was set to Al. The constituent material of the reflection suppressing layer was set to a mixed composition of FeSi (Fe=5 atm %) or Mo and silica, and a composition gradient was provided.

Specifically, when the total film thickness of the reflection suppressing layer was set to 100%, in the reflection suppressing layer of Example 1, the content of the FeSi in the film thickness range of 0% to 40% on the reflection layer side was set to 10 atm %; the content of the FeSi in the film thickness range of 40% to 70% was set to 40 atm %; and the content of the FeSi in the film thickness range of 70% to 100% was set to 60 atm %. In addition, in the reflection suppressing layer of Example 2, the content of the FeSi in the film thickness range of 0% to 10% on the reflection layer side was set to 5 atm %; and the content of the FeSi in the film thickness range of 10% to 35% was set to 40 atm %; and the content of the FeSi in the film thickness range of 35% to 100% was set to 60 atm %. In addition, in the reflection suppressing layer of Example 3, the content of Mo in the film thickness range of 0% to 10% on the reflection layer side was set to 5 atm %; and the content of the Mo in the film thickness range of 10% to 35% was set to 40 atm %; and the content of the FeSi in the film thickness range of 35% to 100% was set to 60 atm %. That is, in Example 3, the type of non-dielectric material was changed according to the film thickness range of 0% to 35% on the reflection layer side and the film thickness range of 35% to 100%.

In Comparative Example 1, an inorganic polarizing plate having the structure illustrated in FIG. 13 was subjected to the simulation. In the inorganic polarizing plate of Comparative Example 1, the grid-shaped protrusions having a width of 46 nm are arranged on the transparent substrate at a pitch of 140 nm. The grid-shaped protrusion was formed by sequentially laminating a dielectric layer having a film thickness of 10 nm and an absorption layer having a film thickness of 28 nm on a reflection layer having a film thickness of 180 nm. The constituent material of the reflection layer was set to Al, the constituent material of the dielectric layer was set to silica, and the constituent material of the absorption layer was set to FeSi (Fe=5 atm %).

Results of simulation verification of transmission-axis transmittance Tp and absorption-axis reflectance Rs for the inorganic polarizing plates of Examples 1 to 3 and Comparative Example 1 are illustrated in FIGS. 5 to 8.

Figure 5:
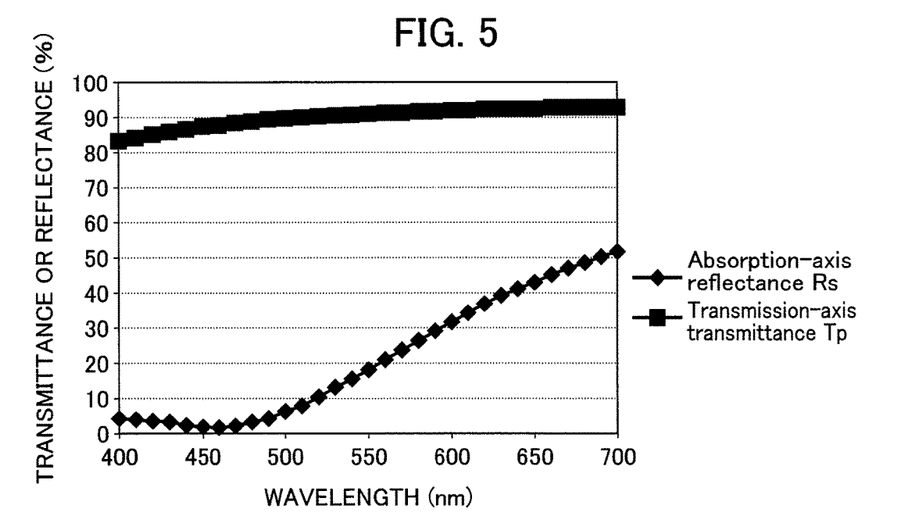
FIG. 5 is a graph showing results of simulation verification of transmission-axis transmittance Tp and absorption-axis reflectance Rs of an inorganic polarizing plate of Example 1.
Figure 6:
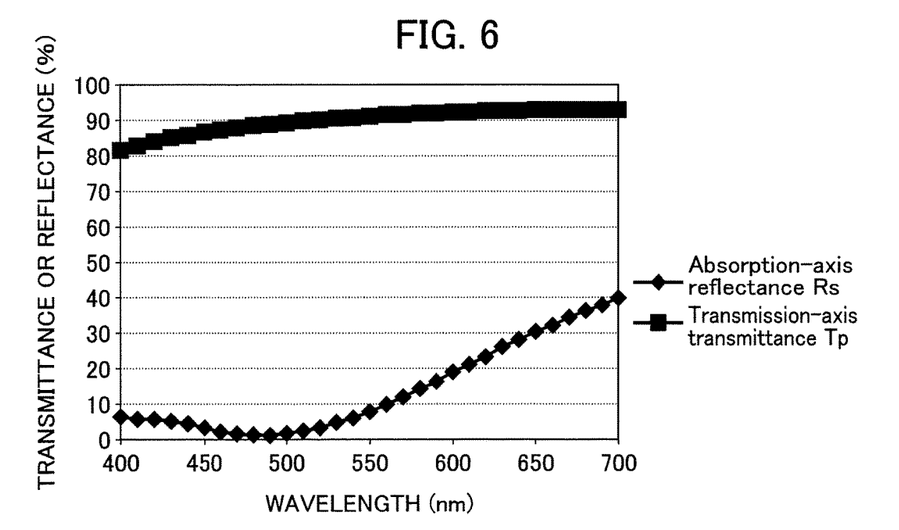
FIG. 6 is a graph showing results of simulation verification of transmission-axis transmittance Tp and absorption-axis reflectance Rs of an inorganic polarizing plate of Example 2.
Figure 7:
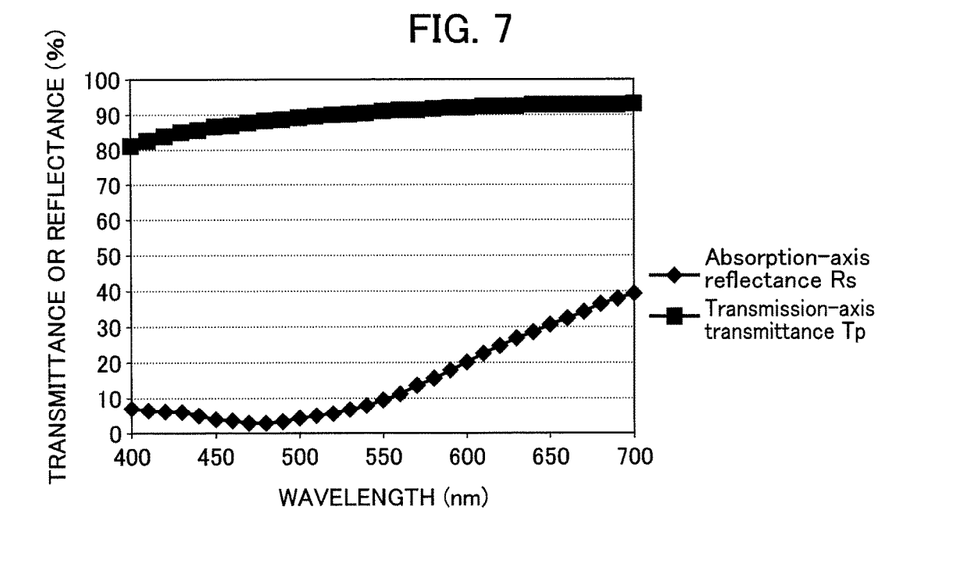
FIG. 7 is a graph showing results of simulation verification of transmission-axis transmittance Tp and absorption-axis reflectance Rs of an inorganic polarizing plate of Example 3.
Figure 8:
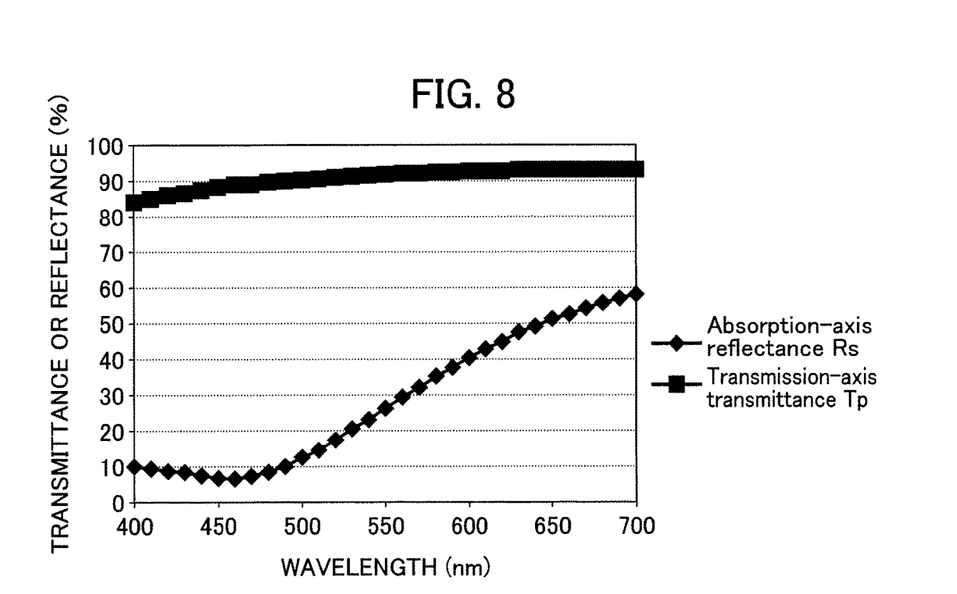
FIG. 8 is a graph showing results of simulation verification of transmission-axis transmittance Tp and absorption-axis reflectance Rs of an inorganic polarizing plate of Comparative Example 1.

As can be seen by comparing FIGS. 5 to 7 with FIG. 8, the inorganic polarizing plates of Examples 1 to 3 where the reflection suppressing layer is laminated on the reflection layer is lower in the absorption-axis reflectance Rs than and is about equal in the transmission-axis transmittance Tp to the inorganic polarizing plate of Comparative Example 1 where the dielectric layer and the absorption layer are laminated on the reflection layer. From these results, it is confirmed that, the inorganic polarizing plates of Examples 1 to 3 are smaller in the number of layers than the inorganic polarizing plate of Comparative Example 1, but more excellent in the optical characteristics than the inorganic polarizing plate of Comparative Example 1.

As can be seen by comparing FIG. 5 with FIGS. 6 and 7, as compared with the inorganic polarizing plate of Example 1, in the inorganic polarizing plates of Examples 2 and 3, the wavelength at the minimum point of absorption-axis reflectance Rs was shifted to the longer wavelength side. From this result, it is confirmed that the wavelength at the minimum point of absorption-axis reflectance Rs can be adjusted by adjusting the composition gradient of reflection suppressing layer.

The inorganic polarizing plate of Example 3 was obtained by replacing a portion of FeSi (Fe=5 atm %) in the reflection suppressing layer of the inorganic polarizing plate of Example 2 with Mo. It is considered that it is more excellent in heat resistance than the inorganic polarizing plate of Example 2.

Examples 4 to 6 and Comparative Examples 2 to 3

In Examples 4 to 6 and Comparative Examples 2 and 3, the optical characteristics of the inorganic polarizing plates were verified by the electromagnetic field simulation according to the RCWA method. For the simulation, the grating simulator Gsolver produced by Grating Solver Development was used.

In Examples 4 to 6 and Comparative Examples 2 and 3, the inorganic polarizing plates having the structure illustrated in FIG. 1 were subjected to the simulation. In each of the inorganic polarizing plates of Examples 4 to 6 and Comparative Examples 2 and 3, grid-shaped protrusions having a width of 46 nm were arranged on a transparent substrate at a pitch of 140 nm, and the surfaces of the transparent substrate and the grid-shaped protrusions were covered with a protective film (a fluorine-based water repellent film coated with perfluorodecyltriethoxysilane) having a film thickness of 1 nm. The grid-shaped protrusion was set to a grid-shaped protrusion where a reflection suppressing layer having a film thickness of 38 nm was laminated on a reflection layer having a film thickness of 180 nm. The constituent material of the reflection layer was set to Al. In Examples 4 to 6, the constituent material of the reflection suppressing layer was set to a mixed composition of FeSi (Fe=5 atm %) and silica, and a composition gradient was provided. In addition, in Comparative Examples 2 and 3, the constituent material of the reflection suppressing layer was set to a mixed composition of FeSi (Fe=5 atm %) and silica, and the content of the FeSi was fixed to 50 atm % (Comparative Example 2) or 16.6 atm % (Comparative Example 3).

Figure 9:
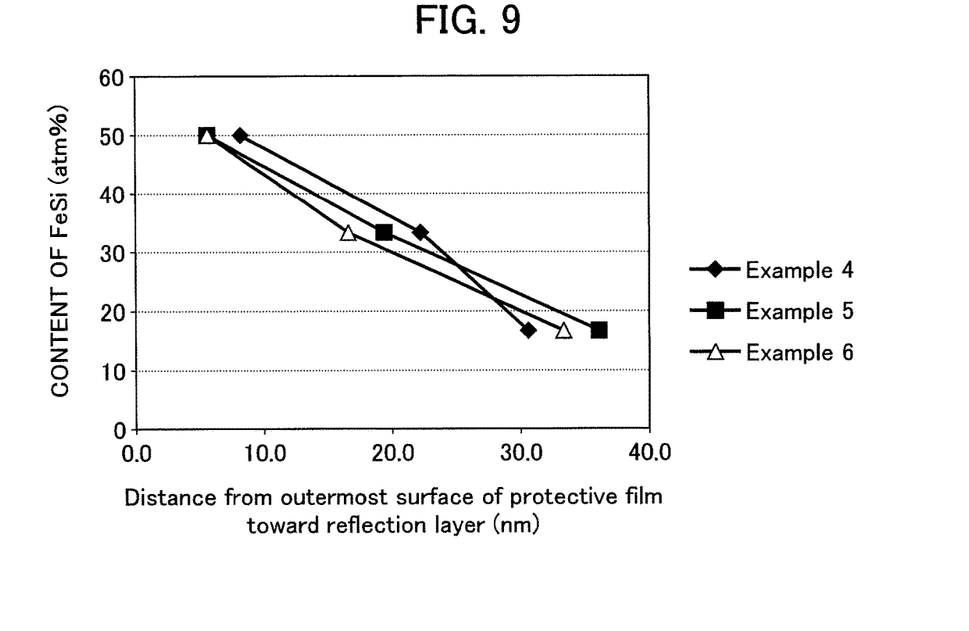
FIG. 9 is a graph showing composition gradients of reflection suppressing layers of inorganic polarizing plates of Examples 4 to 6.

The composition gradient of the reflection suppressing layer in the inorganic polarizing plates of Examples 4 to 6 is illustrated in FIG. 9. FIG. 9 illustrates a relationship between the distance in the film thickness direction of the grid-shaped protrusion from the outermost surface of the protective film toward the reflection layer and the content of the FeSi. As illustrated in FIG. 9, the content of the FeSi is relatively high on the protective film side and relatively low on the reflection layer side.

Results of simulation verification of transmission-axis transmittance Tp and absorption-axis reflectance Rs with respect to light with a wavelength 450 nm for the inorganic polarizing plates of Examples 4 to 6 and Comparative Examples 2 and 3 are illustrated in Table 1 below.

TABLE 1

| | Transmission-axis transmittance Tp (%) | Absorption-axis reflectance Rs (%) |
|---|---|---|
| Comparative Example 2 (Content of FeSi: 50 atm %) | 79.0 | 4.8 |
| Example 4 | 86.1 | 1.1 |
| Example 5 | 86.7 | 1.5 |
| Example 6 | 86.9 | 2.1 |
| Comparative Example 3 (Content of FeSi: 16.6 atm %) | 87.8 | 17.8 |

As can be seen from Table 1, the inorganic polarizing plate of Comparative Example 2 where the content of the FeSi in the reflection suppressing layer was 50 atm % is higher in the absorption-axis reflectance Rs and lower in the transmission-axis transmittance Tp than the inorganic polarizing plates in Examples 4 to 6 where a composition gradient was provided in the reflection suppressing layer. In addition, the inorganic polarizing plate of Comparative Example 3 where the content of the FeSi in the reflection suppressing layer was set to 16.6 atm % is about equal in the transmission-axis transmittance Tp to but more higher in the absorption-axis reflectance Rs than the inorganic polarizing plates of Examples 4 to 6 where a composition gradient was provided in the reflection suppressing layer. From these results, it is confirmed that the inorganic polarizing plates of Examples 4 to 6 where a composition gradient was provided in the reflection suppressing layer are more excellent in optical characteristics than the inorganic polarizing plates of Comparative Examples 2 and 3 where a composition gradient is not provided in the reflection suppressing layer.

Examples 7 to 9

In Examples 7 to 9, the optical characteristics of the inorganic polarizing plates were verified by the electromagnetic field simulation according to the RCWA method. For the simulation, the grating simulator Gsolver produced by Grating Solver Development was used.

Figure 10:
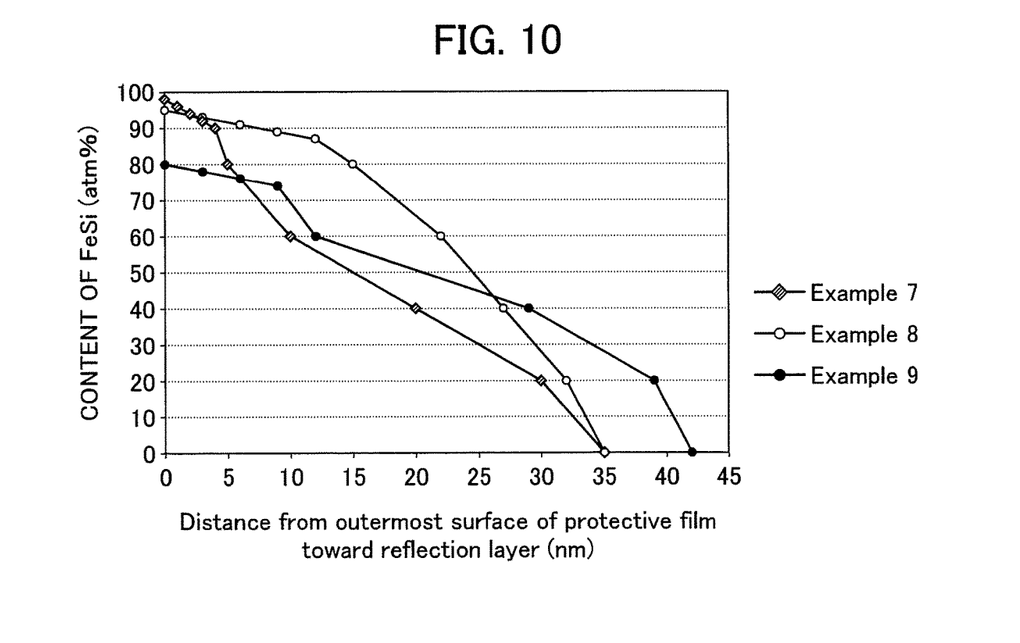
FIG. 10 is a graph showing composition gradients of reflection suppressing layers of inorganic polarizing plates of Examples 7 to 9.

In Examples 7 to 9, the inorganic polarizing plates having the structure illustrated in FIG. 1 were subjected to the simulation. In each of the inorganic polarizing plates of Examples 7 to 9, grid-shaped protrusions having a width of 46 nm were arranged on a transparent substrate at a pitch of 140 nm, and the surfaces of the transparent substrate and the grid-shaped protrusions were covered with a protective film (a fluorine-based water repellent film coated with perfluorodecyltriethoxysilane) having a film thickness of 1 nm. The grid-shaped protrusion was set to a grid-shaped protrusion where a reflection suppressing layer was laminated on a reflection layer with a film thickness of 180 nm. The constituent material of the reflection layer was set to Al. The constituent material of the reflection suppressing layer was set to a mixed composition of FeSi (Fe=5 atm %) and silica, and a composition gradient illustrated in Table 2 and FIG. 10 was provided.

TABLE 2

| Example 7 | | Example 8 | | Example 9 | |
|---|---|---|---|---|---|
| Distance from outermost surface of protective film toward reflection layer (nm) | Content of FeSi (%) | Distance from outermost surface of protective film toward reflection layer (nm) | Content of FeSi (%) | Distance from outermost surface of protective film toward reflection layer (nm) | Content of FeSi (%) |
| 0 | 98 | 0 | 95 | 0 | 80 |
| 1 | 96 | 3 | 93 | 3 | 78 |
| 2 | 94 | 6 | 91 | 6 | 76 |
| 3 | 92 | 9 | 89 | 9 | 74 |
| 4 | 90 | 12 | 87 | 12 | 60 |
| 5 | 80 | 15 | 80 | 29 | 40 |
| 10 | 60 | 22 | 60 | 39 | 20 |
| 20 | 40 | 27 | 40 | 42 | 0 |
| 30 | 20 | 32 | 20 | | |
| 35 | 0 | 35 | 0 | | |

Figure 11:
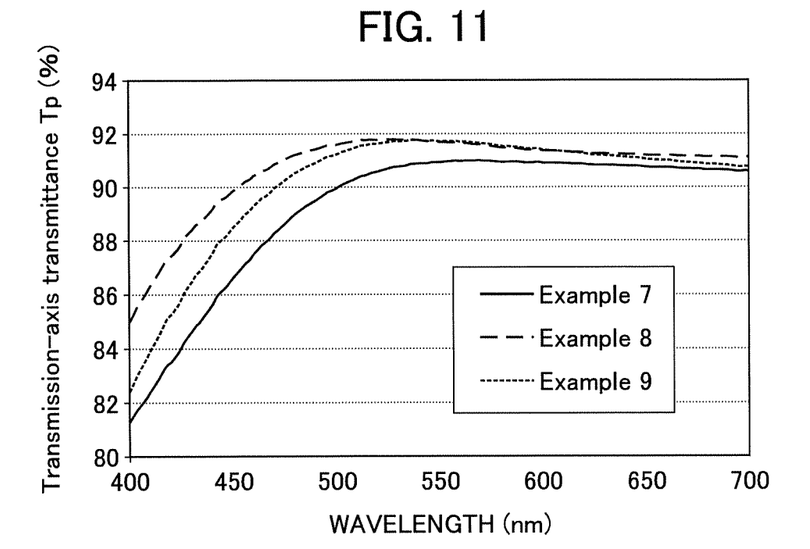
FIG. 11 is a graph showing results of simulation verification of transmission-axis transmittance Tp of the inorganic polarizing plates of Examples 7 to 9.
Figure 12:
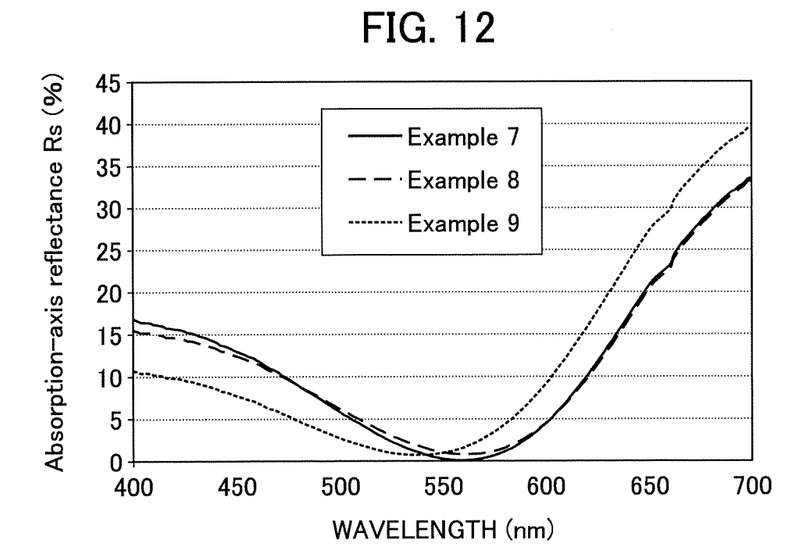
FIG. 12 is a graph showing results of simulation verification of absorption-axis reflectance Rs of the inorganic polarizing plates of Examples 7 to 9.

Results of simulation verification of transmission-axis transmittance Tp and absorption-axis reflectance Rs for the inorganic polarizing plates of Examples 7 to 9 are illustrated in FIGS. 11 and 12. In addition, results of simulation verification of transmission-axis transmittance Tp, absorption-axis transmittance Ts, transmission-axis reflectance Rp, and absorption-axis reflectance Rs with respect to light with a wavelength of 520 nm to 590 nm are illustrated in Table 3 below.

TABLE 3

|  | Average value of transmission-axis transmittance Tp (%) | Average value of absorption-axis transmittance Ts (%) | Average value of transmission-axis reflectance Rp (%) | Average value of absorption-axis reflectance Rs (%) |
|---|---|---|---|---|
| Example 7 | 90.9 | 0.008 | 1.5 | 1.1 |
| Example 8 | 91.6 | 0.012 | 1.9 | 1.7 |
| Example 9 | 91.6 | 0.008 | 1.3 | 2.6 |

As can be seen from FIGS. 11 and 12, and Table 3, the inorganic polarizing plates of Examples 7 to 9 where a composition gradient was provided in the reflection suppressing layer were high in the transmission-axis transmittance Tp and low in the absorption-axis reflectance Rs. In addition, the inorganic polarizing plates of Examples 7 to 9 were low in the absorption-axis transmittance Ts and the transmission-axis reflectance Rp. From these results, it is confirmed that the inorganic polarizing plates of Examples 7 to 9 where a composition gradient was provided in the reflection suppressing layer are excellent in optical characteristics.

EXPLANATION OF REFERENCE NUMERALS 10 inorganic polarizing plate
11 transparent substrate
12 grid-shaped protrusion
20 inorganic polarizing plate
21 transparent substrate
22 grid-shaped protrusion
50 inorganic polarizing plate
51 transparent substrate
52 grid-shaped protrusion
121 reflection layer
122 reflection suppressing layer
125 content of the non-dielectric material
126 protective film
221 second reflection suppressing layer
222 reflection layer
223 reflection suppressing layer
225 content of the non-dielectric material
226 protective film
521 reflection layer
522 dielectric layer
523 absorption layer
P pitch of grid-shaped protrusions
W width of grid-shaped protrusion
H height of grid-shaped protrusion

What is claimed is:

1. An inorganic polarizing plate having a wire grid structure, comprising:
   a transparent substrate; and
   grid-shaped protrusions arranged on the transparent substrate at a pitch shorter than a wavelength of light in a use band,
   wherein the grid-shaped protrusion includes a reflection layer and a reflection suppressing layer which includes a dielectric material and a non-dielectric material and of which a content of the non-dielectric material increases as a separation from the reflection layer increases, and
   wherein the reflection layer is between the reflection suppressing layer and the transparent substrate.

2. The inorganic polarizing plate according to claim 1, wherein the grid-shaped protrusion further includes a second reflection suppressing layer which includes a dielectric material and a non-dielectric material and of which a content of the non-dielectric material changes in a film thickness direction between the transparent substrate and the reflection layer, wherein the second reflection suppression layer is between the reflection layer and the transparent substrate.

3. The inorganic polarizing plate according to claim 1, wherein a width of the reflection suppressing layer is smaller than a width of the reflection layer.

4. The inorganic polarizing plate according to claim 1, further comprising a protective film which covers at least a surface of the reflection suppressing layer.

5. The inorganic polarizing plate according to claim 4, wherein the protective film includes at least one of an inorganic oxide film and a fluorine-based water repellent film.

6. The inorganic polarizing plate according to claim 1, wherein the dielectric material included in the reflection suppressing layer contains at least one of Si and an Si oxide.

7. The inorganic polarizing plate according to claim 1, wherein the non-dielectric material included in the reflection suppressing layer contains a single-element substance except for a single-element substance of Si of at least one element selected from a group including Fe, Ta, Si, Ti, Mg, W, Mo, and Al or an alloy thereof.

8. The inorganic polarizing plate according to claim 7, wherein the non-dielectric material included in the reflection suppressing layer contains a single-element substance of at least one metal selected from a group including Fe, Ta, W, Mo, and Al or an alloy of the metal.

9. The inorganic polarizing plate according to claim 1, wherein a content of the non-dielectric material at an end of a side of the reflection suppressing layer opposite to the reflection layer is 45 atm % to 98 atm %.

10. An optical instrument comprising the inorganic polarizing plate according to claim 1.

11. A method of manufacturing an inorganic polarizing plate having a wire grid structure, comprising:
   forming a laminated body including a reflection layer and a reflection suppressing layer which includes a dielectric material and a non-dielectric material and of which a content of the non-dielectric material increases as a separation from the reflection layer increases on a transparent substrate in this order from the transparent substrate side; and
   forming grid-shaped protrusions arranged on the transparent substrate at a pitch shorter than a wavelength of light in a use band by selectively etching the laminated body.

12. The method according to claim 11, wherein the reflection suppressing layer is formed by disposing the dielectric material and the non-dielectric material as sputtering targets in a chamber and controlling a discharge state of the sputtering targets.

13. The method according to claim 11, further comprising applying heat treatment after forming the laminated body or after forming the grid-shaped protrusions.

14. The method according to claim 11, wherein the dielectric material included in the reflection suppressing layer contains at least one of Si and an Si oxide.

15. The method according to claim 11, wherein the non-dielectric material included in the reflection suppressing layer contains a single-element substance except for a single-element substance of Si of at least one element selected from a group including Fe, Ta, Si, Ti, Mg, W, Mo, and Al or an alloy thereof.

16. The method according to claim 11, wherein the content of the non-dielectric material at an end of a side of the reflection suppressing layer opposite to the reflection layer is 45 atm % to 98 atm %.

* * * * *